(12) United States Patent
Deshpande et al.

(10) Patent No.: US 10,726,182 B1
(45) Date of Patent: Jul. 28, 2020

(54) OPERATOR AWARE FINITE STATE MACHINE FOR CIRCUIT DESIGN SIMULATION

(71) Applicant: Xilinx, Inc., San Jose, CA (US)

(72) Inventors: Sandeep S. Deshpande, Longmont, CO (US); Feng Cai, Longmont, CO (US); Saikat Bandyopadhyay, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 26 days.

(21) Appl. No.: 16/100,041

(22) Filed: Aug. 9, 2018

(51) Int. Cl.
  *G06F 17/50* (2006.01)
  *G06F 30/3312* (2020.01)
  *G06F 9/448* (2018.01)
  *G06F 30/327* (2020.01)

(52) U.S. Cl.
  CPC ........ *G06F 30/3312* (2020.01); *G06F 9/4498* (2018.02); *G06F 30/327* (2020.01)

(58) Field of Classification Search
  CPC . G06F 30/33; G06F 30/30; G06F 8/43; G06F 2111/04; G06F 30/34; G06F 30/396; G06F 8/34; G06F 8/447; G06F 8/48; G06F 9/4498; G01R 31/318357

USPC .................................................. 716/110–118
  See application file for complete search history.

(56) References Cited

U.S. PATENT DOCUMENTS

| | | | |
|---|---|---|---|
| 2003/0125915 A1* | 7/2003 | Gabele ................ | G06F 17/5022 703/13 |
| 2007/0260441 A1* | 11/2007 | Bobok ................ | G06F 17/5022 703/14 |
| 2011/0113392 A1* | 5/2011 | Chakraborty ......... | G06F 17/505 716/102 |

* cited by examiner

*Primary Examiner* — Binh C Tat
(74) *Attorney, Agent, or Firm* — Crawford Maunu PLLC

(57) ABSTRACT

Disclosed approaches involve simulating a circuit design specified in a hardware description language (HDL). During simulation, a thread is started at an edge of a simulation clock signal for evaluation of states of a finite state machine (FSM) that represent a series of events specified in a statement in the HDL. The thread transitions from one state to a next state in the FSM in response to evaluation of the one state. In response to encountering a fork state in the FSM, the thread is forked into two threads during simulation. The fork state represents a composite operator in the statement, and the FSM has a branch from the fork state for each operand of the composite operator. In response to encountering a join state in the FSM by the two threads, the two threads are joined into one thread.

18 Claims, 6 Drawing Sheets

OPERATOR AWARE FINITE STATE MACHINE FOR CIRCUIT DESIGN SIMULATION

TECHNICAL FIELD

The disclosure generally relates to simulating circuit designs and modeling debug statements.

BACKGROUND

An "assertion" in a hardware description language (HDL), such as SystemVerilog, is a statement that determines whether or not the state of the simulated circuit design satisfies certain specified conditions. Assertions can be used to test and debug circuit designs. Assertions can test the state of the simulation at a particular moment of the simulation or over a period of time during the simulation.

In SystemVerilog, for example, a "sequence" can be used to test an assertion over a period of time. An assertion having a sequence tests for the occurrence of a series of events over a period of time during the simulation.

Efficient use of computer resources is important during simulation. Costly computer requirements and long runtimes add to production costs and can delay product releases. Thus, a modeling system that reduces memory and computational requirements is desirable.

SUMMARY

A disclosed method includes simulating a circuit design specified in a hardware description language (HDL). During simulation, a thread is started at an edge of a simulation clock signal for evaluation of states of a finite state machine (FSM) that represent a series of events specified in a statement in the HDL. The thread transitions from one state to a next state in the FSM in response to evaluation of the one state. In response to encountering a fork state in the FSM, the thread is forked into two threads during simulation. The fork state represents a composite operator in the statement, and the FSM has a branch from the fork state for each operand of the composite operator. In response to encountering a join state in the FSM by the two threads, the two threads are joined into one thread.

A disclosed system includes one or more processors and a memory arrangement coupled to the one or more processors. The memory arrangement is configured with instructions that when executed by the one or more processors, cause the one or more processors to simulate a circuit design specified in a hardware description language (HDL). During simulation, a thread is started at an edge of a simulation clock signal for evaluation of states of a finite state machine (FSM) that represent a series of events specified in a statement in the HDL. The thread transitions from one state to a next state in the FSM in response to evaluation of the one state. In response to encountering a fork state in the FSM, the thread is forked into two threads during simulation. The fork state represents a composite operator in the statement, and the FSM has a branch from the fork state for each operand of the composite operator. In response to encountering a join state in the FSM by the two threads, the two threads are joined into one thread.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

Figure 1:
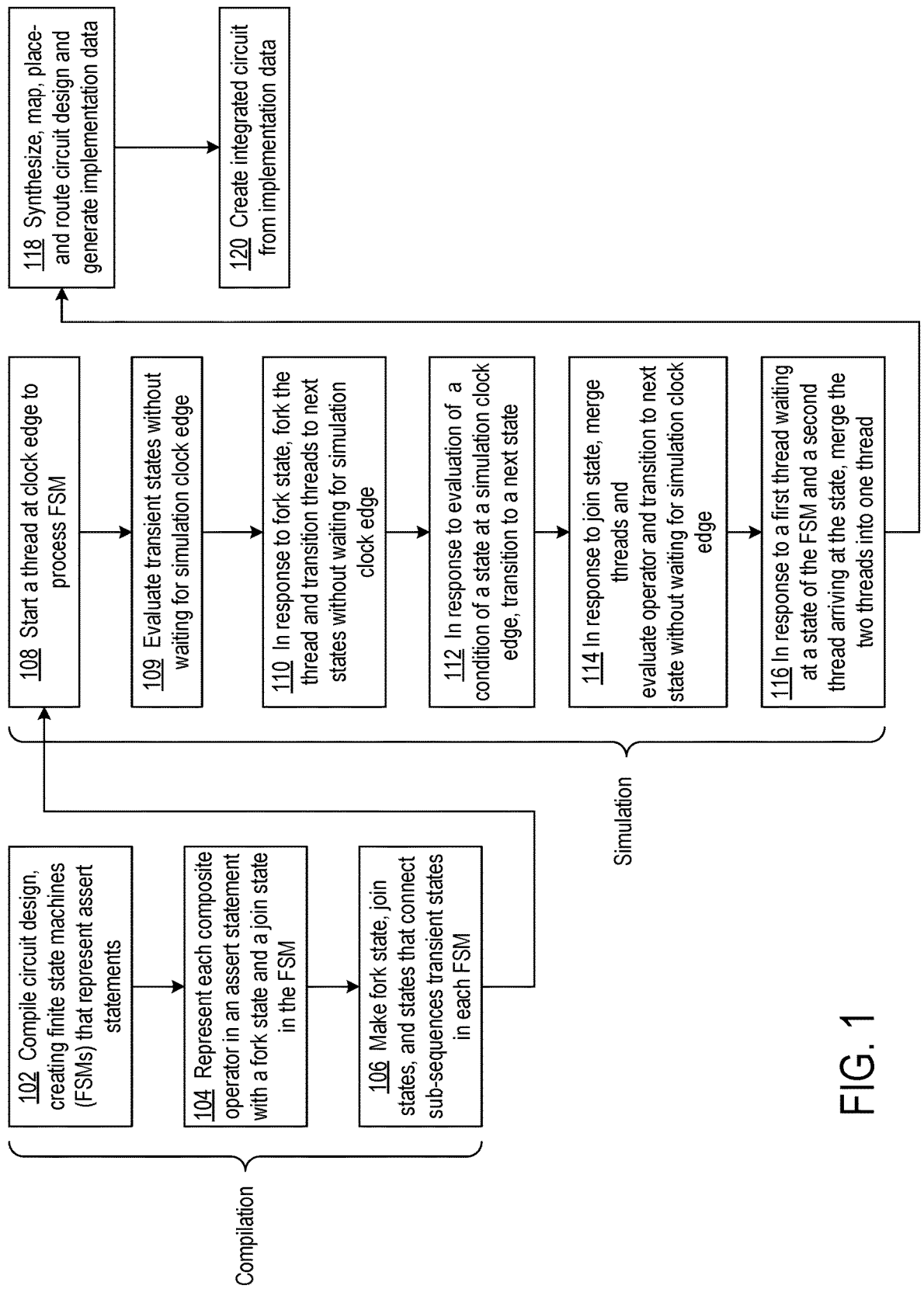
FIG. 1 shows a flowchart of an exemplary process of compiling, simulating, and implementing a circuit design.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches are described in terms of SystemVerilog assertion (SVA) sequences. Challenges in modeling SVA sequences arise from various temporal operators and composite operators. Prior approaches for modeling a given sequence using state modeling of a simple finite state machine (FSM) can make inefficient use of memory and computational resources. Though the disclosed approaches are disclosed in the context of SVA sequences, those skilled in the art will recognize that the approaches are applicable to other hardware description languages (HDLs) and simulation tools.

Operator-aware states, transient states and thread merging are employed in the disclosed FSM and simulation to reduce requirements for memory and computational resources during simulation. When a simulation encounters an operator-aware state in the FSM of a sequence, the simulation can respond based on the operator represented by the state. For example, upon reaching the operator-aware state for an AND operator, the simulation will fork a thread into two threads. Each thread will follow one of the two branches of the FSM for the two operands of the AND operator.

Transient states in the FSM represent compositions of sequences from sub-sequences and compound sequences. A transient state is a state that does not consume any delay. That is, when a transient state is encountered during simulation, the simulation does not wait for a simulation clock edge to transition to a next state. Transient states can be useful in modeling zero delay (e.g., ##0) in a sequence, representing operator-aware states or other similar states that fork a simulation thread, and composition of compound sequences with sub-sequences.

Multiple simulation threads waiting at the same state in an FSM can be merged into a single thread, thereby reducing usage of computational resources and memory. When a simulation thread evaluating an FSM arrives at a state at which another thread is waiting, the two threads can be merged into one thread. As the two threads would have identical behavior going forward, only one thread is needed to evaluate the FSM.

FIG. 1 shows a flowchart of an exemplary process of compiling, simulating, and implementing a circuit design. Blocks 102, 104, and 106 illustrate compilation; blocks 108, 110, 112, 114, and 116 illustrate simulation; and blocks 118 and 120 illustrate implementation.

Figure 2:
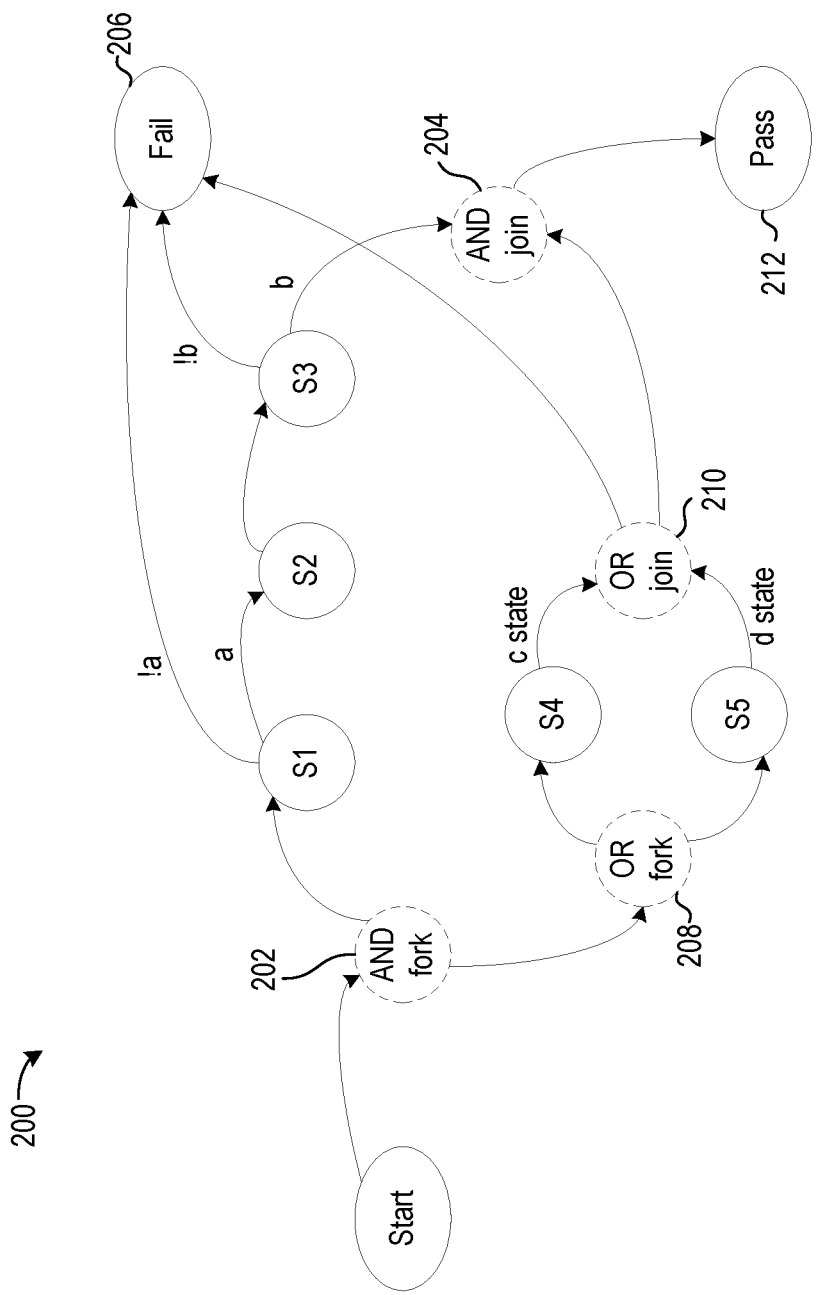
FIG. 2 shows an exemplary FSM having operator-aware fork and join states.
Figure 3:
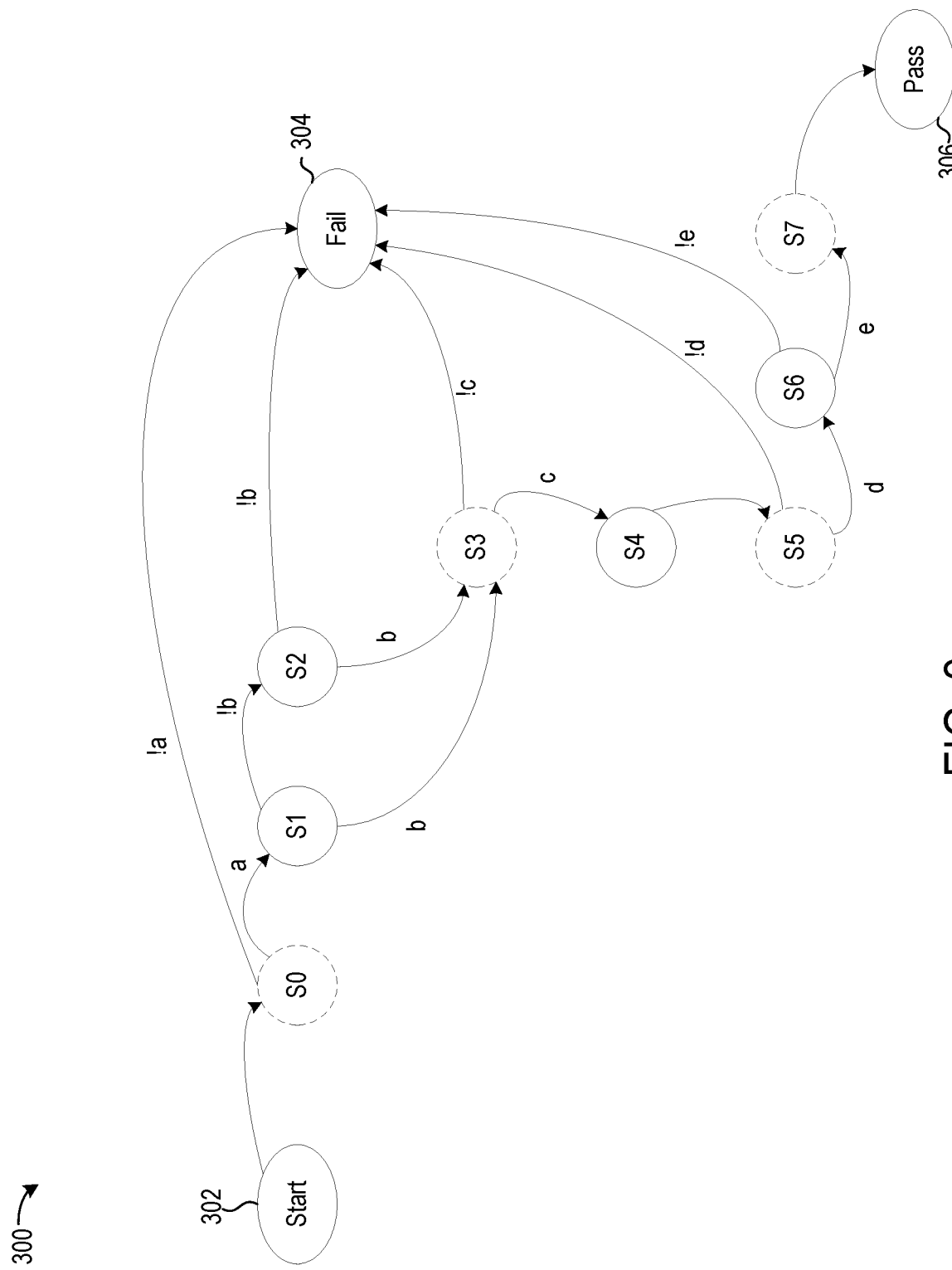
FIG. 3 shows an exemplary FSM having transient states that join sub-sequences of a compound sequence.
Figure 4:
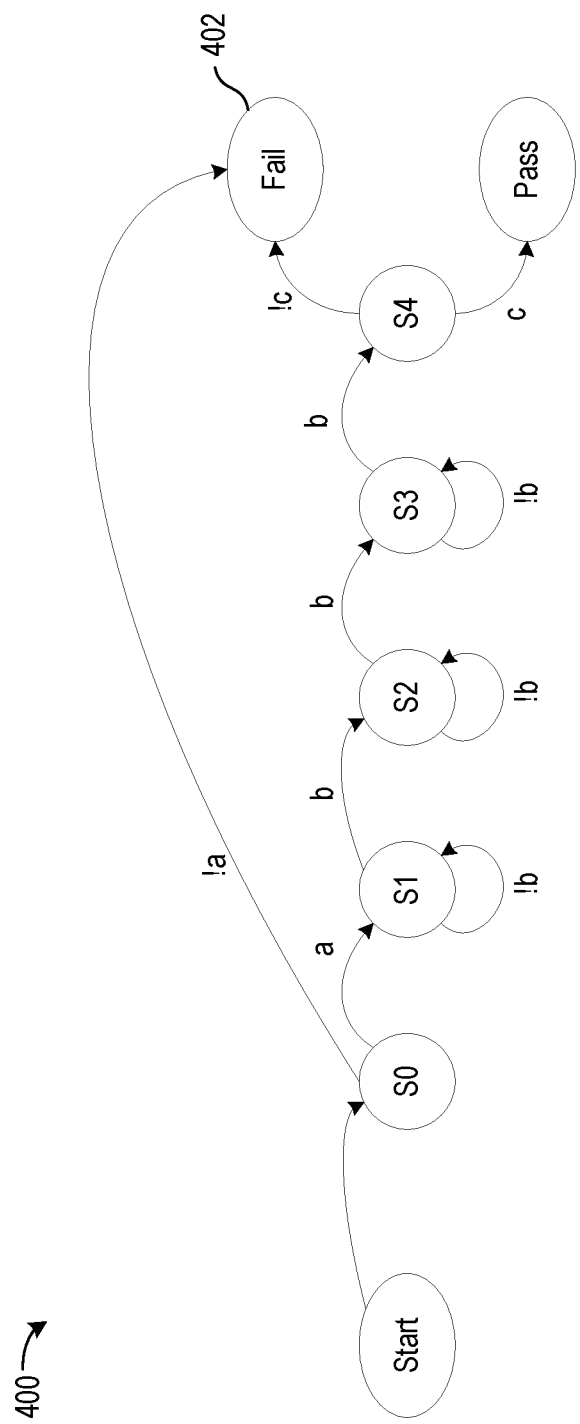
FIG. 4 shows an exemplary FSM in which simulation threads waiting at the same state can be merged.

At block 102, an electronic design automation (EDA) tool compiles a circuit design and in the process creates FSMs to represent assert statements specified in the circuit design. Each assert statement is represented by an FSM. The states of the FSM represent a series of events specified in an assert statement. The FSM can be a table stored in the memory of a computer system. The table can specify the possible states of the sequence in the assert statement and the conditions for transitioning from one state to another state. Exemplary FSMs are shown in FIGS. 2, 3, and 4.

Compilation of an assert statement into an FSM includes pass and fail states in the FSM. One or more of the states of the FSM are connected to the pass state, and one or more other states of the FSM are connected to the fail state.

Blocks 104 and 106 show the processing of the EDA in creating an FSM that efficiently models compound sequences and composite operators. A compound sequence includes multiple sub-sequences that are connected by a composite operator(s). For example, "AND" and "OR" are composite operators in Verilog and can connect sub-sequences in an assert statement. A composite operator typically connects results of two parallel sub-sequences. A composite operator differs from a Boolean operator (e.g., &&, ||, !) in that evaluation of a sequence (or sub-sequence) having a composite operator is performed over multiple simulation clock cycles. Evaluation of an expression having a Boolean operator is performed within a single simulation clock cycle. In response to finding a composite operator in an assert statement, at block 104 the EDA tool specifies a fork state and a paired join state in the FSM. When the fork state is encountered during simulation, two parallel threads are initiated to evaluate the two branches of the FSM. The two branches are connected by a join state, at which state the results of the branches can be evaluated.

At block 106, the EDA tool designates selected states in the FSM as transient states. As indicated above, a transient state is a state that does not consume any delay during simulation. Fork states, join states, and states that connect sub-sequences can be recognized as transient states during simulation by type indicators associated with the states, for example.

Once a simulation model of the circuit design is created, the circuit design can be simulated. Blocks 108, 110, 112, 114, and 116 illustrate the processing associated with simulating FSMs that represent assert statements in the circuit design. A simulator executing on a computer system operates according to the simulation model. At block 108, the simulator starts a thread at an edge of a simulation clock signal to begin processing of an FSM. During simulation, the simulator evaluates each state and remains at the same state or transitions to another state depending on the results of evaluating the condition of the current state. Transient states in the FSM are evaluated without waiting for an edge of the simulation clock as indicated by block 109.

At block 110, in response to a fork state in the FSM, the simulator forks one thread into two threads and transitions the two threads to next states in the FSM. The fork state is a transient state, so the simulator does not wait for a simulation clock edge to fork the threads and transition to the next states. Fork states can be associated with composite operators such as AND, OR, XOR., etc.

For states of the FSM that are not transient states, at block 112 each execution thread of the simulator evaluates the conditions specified at the current state of the thread at an edge of the simulation clock signal. The thread either transitions to another state in the FSM or remains at the current state based on the results of evaluating the condition. Note that at least one state of the FSM transitions to the pass state of the FSM in response to evaluation that state evaluating to true, and at least one state of the FSM transitions to the fail state of the FSM in response to evaluation of that state evaluating to false.

At block 114, in response to encountering a join state in the FSM, the simulator waits until the simulator threads of all branches that converge at the join state arrive at the join state. The simulator merges the threads into one thread and evaluates the operator of the join state without waiting for an edge of the simulation clock signal. For example, if the join state is associated with an OR composite operator, the remaining thread of the simulator evaluates the condition carried with the transitions of the merge threads and if either condition is true, the simulator transitions to the pass state, for example. If both conditions are false, the simulator transitions to the fail state, for example.

Two simulator threads can also be merged into a single thread if the two threads are waiting at the same state. For example, an assert statement may have no temporal bounds and the simulator starts a new thread at each successive simulation clock cycle to evaluate the representative FSM. FIG. 4 shows an example of an FSM that represents such an assert statement. At block 116, in response to a first thread waiting at a state and a second thread arriving at the same state while the first thread is still waiting, the simulator merges the two threads into a single thread. Memory and computation resources are saved by tracking the state of each thread and merging duplicate threads into a single thread.

After simulating the circuit design and making any desired changes to the design, the circuit design can be implemented into an operational circuit. At block 118, an EDA tool can synthesize, map, place-and-route, and generate implementation data. At block 120, an integrated circuit (IC) chip or device can be made from the implementation data. The implementation data can be used to fabricate an application-specific integrated circuit (ASIC) or configure a programmable IC having programmable logic, such as a field programmable gate array (FPGA).

FIGS. 2, 3, and 4 show examples of FSMs generated for different assert statements. FIG. 2 shows an exemplary FSM 200 having operator-aware fork and join states. The FSM represents the statement:

assert property (@ (posedge clk) (a ##2 b) AND (c OR d))
The assert property statement instructs the simulator to determine if the circuit design reaches a state in which signal a is high at one simulation clock cycle, and two simulation clock cycles later signal b is high, and either of signals c or d are high when signal a is high.

The FSM states are operator-aware and when the simulator reaches these operator-aware states, execution of the simulator sequence thread can act based on the operator. For example, upon reaching the operator-aware state 202 that represents the AND composite operator, the simulator will fork a thread into two threads for traversing the branches that stem from state 202. Each branch corresponds to an operand of the AND composite operator. The two branches converge at the join state 204.

At state S1, a simulator thread evaluates the state of signal a at an edge of the simulator clock signal. If signal a is high, the thread transitions to state S2; otherwise, the simulator thread transitions to the fail state 206. At state S2, the simulator thread waits for one simulation clock cycles and then transitions to state S3. At state S3, the simulator thread waits for one more clock cycle and evaluates the state of signal b. If signal b is high, the thread transitions to join 204; otherwise, the simulator thread transitions to fail state 206.

In parallel with the thread that follows the FSM through states S1, S2, and S3, another simulator thread evaluates the FSM through fork state 208, and at fork state 208, the simulator forks another thread. Thus, evaluation of the FSM 200 involves three simulator threads. A first thread evaluates the FSM along the path having states S1, S2, and S3, a second thread evaluates the FSM along the path having state S4, and a third thread evaluates the FSM along the path having state S5.

At state S4, a simulator thread evaluates signal c at an edge of the simulation clock signal, and at state S5 another simulator thread evaluates signal d. The threads carry forward the states of signals c and d in transitioning to the OR join state 210. At join state 210, the two simulator threads are merged into a single thread, and the carried-forward states of signals c and d are evaluated without waiting for an edge of the simulation clock signal. If both signal c and signal d are low, the simulator thread transitions to fail state 206; otherwise, the simulator thread transitions to AND join state 204.

At join state 204, the simulator joins the two simulator threads into one thread without waiting for an edge of the simulation clock signal, and the thread transitions to pass state 212. It will be appreciated that the action taken by the simulator following pass and fail states generally depends on other specified logic of the circuit design.

FIG. 3 shows an exemplary FSM 300 having transient states that join sub-sequences of a compound sequence. The FSM represents the statements:

sequence seq1 a ##[1:2] b ##1 c endsequence
sequence seq2; d ##1 e; endsequence
assert property (@clk seq1 ##1 seq2)

FSM 300 represents the compound sequence having sub-sequences seq1 and seq2. Sub-sequence seq2 is delayed by one simulation clock cycle after sub-sequence seq1. The sub-sequence seq1 tests for a series of events in which signal a is high, and one or two simulation clock cycles later signal b is high, and one simulation clock cycle layer signal c is high. Sub-sequence seq2 tests for a series of events in which signal d is high and one simulation clock cycle later signal c is high.

In compiling the exemplary statements, the compiler creates separate sub-sequences for seq1 and seq2 in the FSM having transient start and final states in each sub-sequence, as the sequence statements do not specify testing the signals at the edge of a clock signal. The transient start state for seq1 is S0 and the transient start state of seq2 is S5. The transient final state of seq1 is S3, and the transient final state of seq2 is S7.

The compiler connects start state 302 to the first state S0 of seq1, and the final state S3 of seq1 is connected to the delay state S4, which is connected to the first state S5 of seq2. The fail state 304 is shared by the sub-sequences represented in the FSM. The final state S7 of seq2 is made a transient state and connected to the pass state 306.

FIG. 4 shows an exemplary FSM 400 in which simulation threads waiting at the same state can be merged. The FSM represents the statement:

assert property (@posedge clk) a ##1 b[=3] ##1 c

The end of the sequence is indeterminate, and multiple simulation threads can be evaluating the FSM. For property to be asserted, at the positive edge of the simulation clock signal, signal a must be high, and after one cycle of delay, signal b must be high for three consecutive or non-consecutive cycles, and after signal b is high for three clock cycles followed by a delay cycle, signal c must be high.

As it is unknown whether signal b will ever be high for three clock cycles, or when any of the occurrences of signal b high will occur, a new thread is started to evaluate the FSM 400 at each simulation clock cycle. A simulation thread begins evaluation of the FSM 400 at state S0, and if at the positive edge of the simulation clock signal, signal a is high, the thread transitions to state S1; otherwise the thread transitions to the fail state 402, and the thread can be terminated.

At state S1, which is a non-transient state, a delay of one simulation clock cycle is incurred and the state of signal b is evaluated. If signal b is high, the thread transitions to state S2, where a delay of one simulation clock cycle is incurred and the state of signal is evaluated. Otherwise, if signal b is not high, the thread remains at state S1. While one thread is evaluating signal b at state S1, the simulator starts another thread to evaluate the FSM beginning at state S0. The first thread remains at state S1 as long as signal b is low. The second thread can transition from state S0 to state S1 when signal a is found to be high on the positive edge of the simulation clock signal. If both the first thread and the second thread are looping back to the same state, i.e., any of states S1, S2, or S3, then the threads can be merged into a single thread by terminating one of the threads. Significant computational and memory savings are achieved by merging threads as the number of simulation clock cycles that a thread can stay at any of states S1, S2, or S3 is indeterminate and a new thread is started at each simulation clock cycle.

Figure 5:
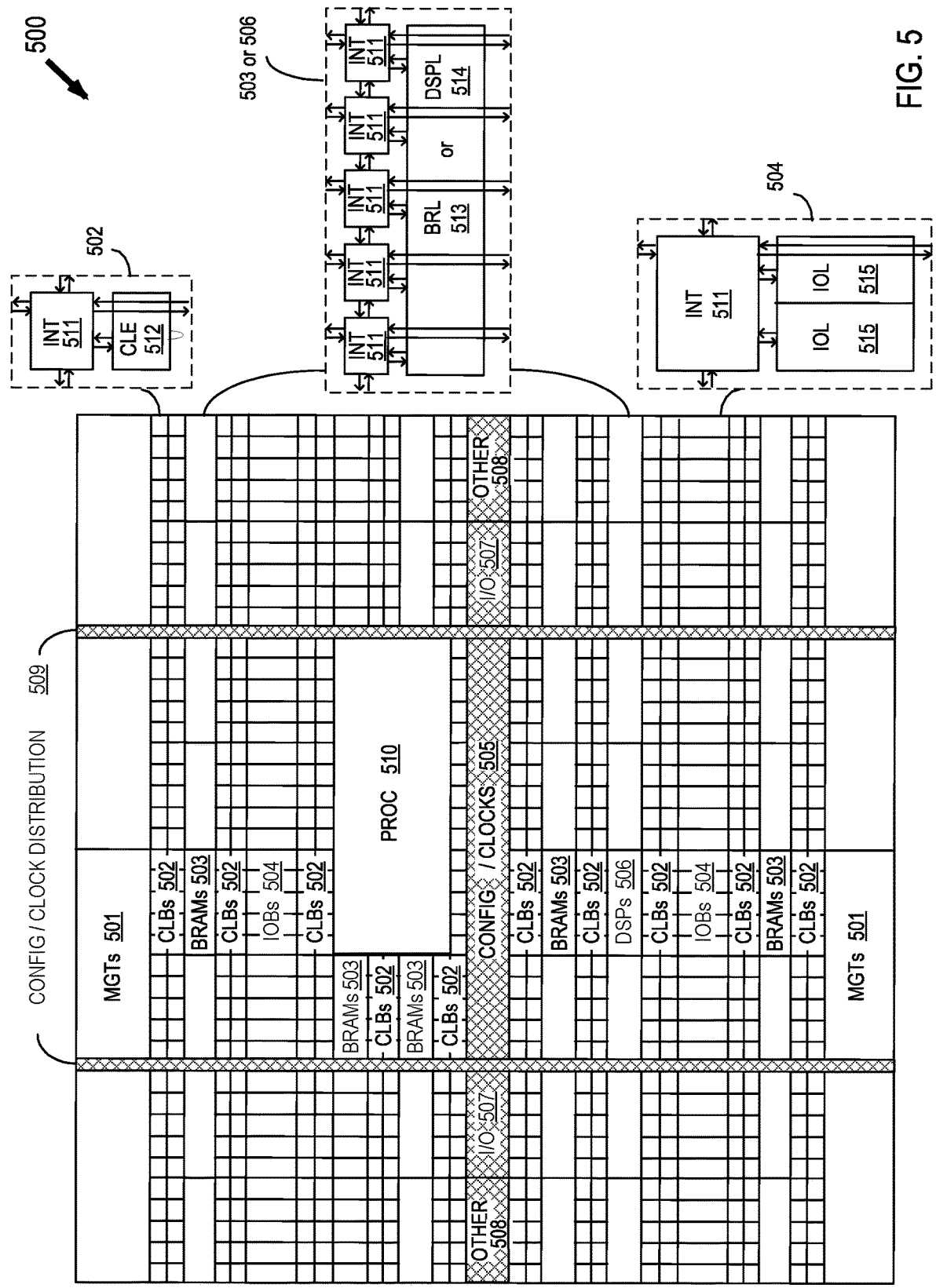
FIG. 5 shows a programmable integrated circuit (IC) on which a circuit developed according to the disclosed processes may be implemented.

FIG. 5 shows a programmable integrated circuit (IC) 500 on which a circuit developed according to the disclosed processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510 and internal and external reconfiguration ports (not shown).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and typically are not confined to the area of the input/output logic element 515.

A columnar area near the center of the die (shown shaded in FIG. 5) is used for configuration, clock, and other control logic. Horizontal areas 509 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual programmable IC, more than one adjacent column of CLBs is typically included wherever the CLBs appear, to facilitate the efficient implementation of user logic.

Figure 6:
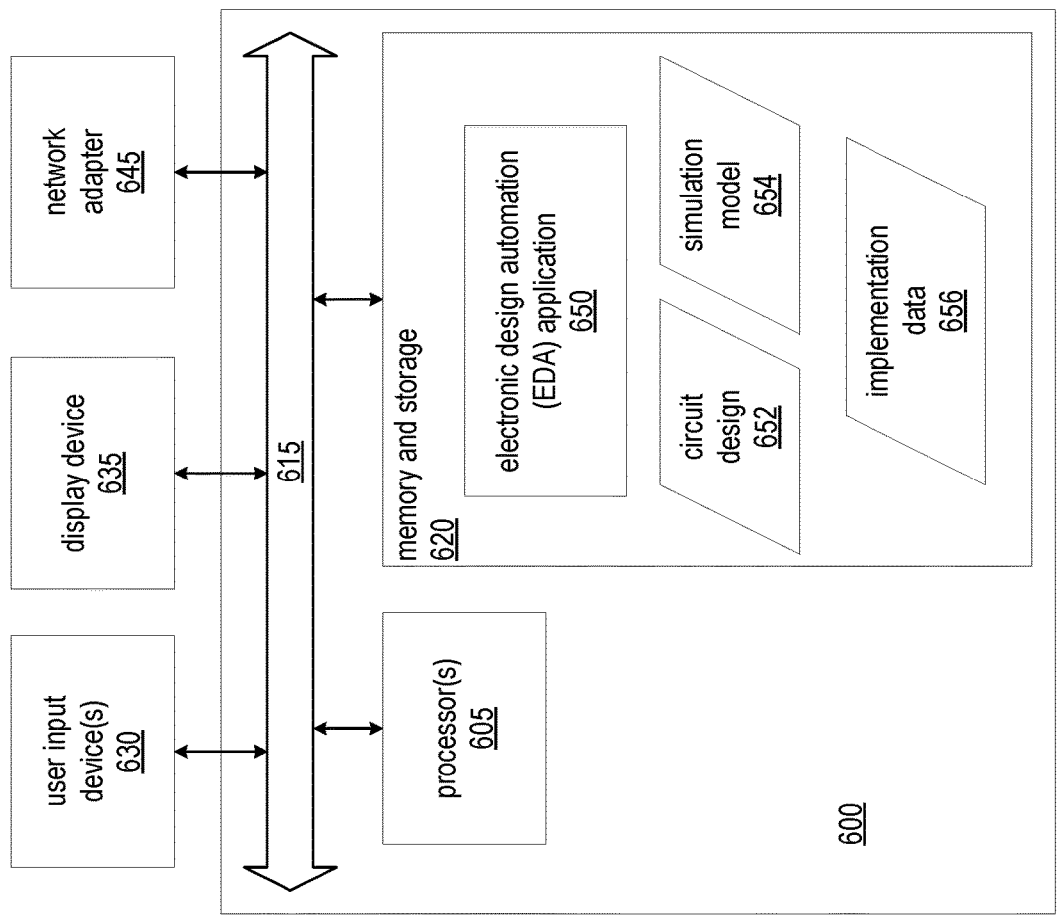
FIG. 6 is a block diagram illustrating an exemplary data processing system.

FIG. 6 is a block diagram illustrating an exemplary data processing system (system) 600. System 600 is an example of an EDA system. As pictured, system 600 includes at least one processor circuit (or "processor"), e.g., a central processing unit (CPU) 605 coupled to memory and storage arrangement 620 through a system bus 615 or other suitable circuitry. System 600 stores program code and circuit design 100 within memory and storage arrangement 620. Processor 605 executes the program code accessed from the memory and storage arrangement 620 via system bus 615. In one aspect, system 600 is implemented as a computer or other data processing system that is suitable for storing and/or executing program code. It should be appreciated, however, that system 600 can be implemented in the form of any system including a processor and memory that is capable of performing the functions described within this disclosure.

Memory and storage arrangement 620 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 600 may also include one or more cache memories (not shown) that provide temporary storage of at least some program code and data in order to reduce the number of times program code and data must be retrieved from local memory and persistent storage during execution.

Input/output (I/O) devices such as user input device(s) 630 and a display device 635 may be optionally coupled to system 600. The I/O devices may be coupled to system 600 either directly or through intervening I/O controllers. A network adapter 645 also can be coupled to system 600 in order to couple system 600 to other systems, computer systems, remote printers, and/or remote storage devices through intervening private or public networks. Modems, cable modems, Ethernet cards, and wireless transceivers are examples of different types of network adapter 645 that can be used with system 600.

Memory and storage arrangement 620 may store an EDA application 650. EDA application 650, being implemented in the form of executable program code, is executed by processor(s) 605. As such, EDA application 650 is considered part of system 600. System 600, while executing EDA application 650, receives and operates on circuit design 652. In one aspect, system 600 performs a design flow on circuit design 652, and the design flow may include generating a simulation model 654, synthesis, mapping, placement, routing, and generating implementation data 656, which can be used to make an integrated circuit, such as fabricating an application specific integrated circuit (ASIC) or configuring a programmable IC.

EDA application 650, circuit design 652, simulation model 654, implementation data 656 and any data items used, generated, and/or operated upon by EDA application 650 are functional data structures that impart functionality when employed as part of system 600 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for simulating tests of sequences of events as specified in a circuit design. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:
   simulating a circuit design specified in a hardware description language (HDL);
   starting during simulation, a thread at an edge of a simulation clock signal for evaluation of states of a finite state machine (FSM) that represent a series of events specified in a statement in the HDL;
   transitioning from one state to a next state in the FSM by the thread in response to evaluation of the one state;
   forking the thread into two threads during simulation in response to encountering a fork state in the FSM, wherein the fork state represents a composite operator in the statement, and the FSM has a branch from the fork state for each operand of the composite operator;

joining the two threads into one thread in response to encountering a join state in the FSM by the two threads;

generating implementation data from the circuit design; and making an integrated circuit (IC) based on the implementation data.

2. The method of claim 1, further comprising:

compiling the series of events in the statement in the circuit design into the FSM, wherein the compiling includes specifying the fork state and the join state in the FSM in response to the composite operator in the statement.

3. The method of claim 1, wherein evaluation of the fork state and evaluation of the join state are initiated without waiting for an edge of the simulation clock signal.

4. The method of claim 1, further comprising:

starting a first thread at a first edge of the simulation clock signal for evaluation of the states of the FSM and starting a second thread at a second edge of the clock signal for evaluation of the states of the FSM; and merging the first thread and the second thread into a single thread in response to the second thread transitioning to a state in the FSM while the first thread is waiting at the state.

5. The method of claim 1, wherein the statement specifies a first sub-sequence followed by a second sub-sequence, the FSM includes first states corresponding to the first sub-sequence and second states corresponding to the second sub-sequence, the first states include a first start state and a first final state, the second states include a second start state and a second final state, the first final state is connected to the second start state, and the first start state, second start state, and second final state are transient states, the method further comprising:

evaluating the first start state without waiting for an edge of the simulation clock signal;

evaluating, in response to transitioning to the second start state, the second start state without waiting for an edge of the simulation clock signal; and evaluating, in response to transitioning to the second final state, the second final state without waiting for an edge of the simulation clock signal.

6. The method of claim 5, further comprising:

compiling the series of events in the statement in the circuit design into the FSM, wherein the compiling includes specifying in the FSM, in response to the statement including the first sub-sequence followed by the second sub-sequence, the first start state, the first final state, the second start state, the second final state, and a state transition from the first final state to the second start state.

7. The method of claim 1, further comprising:

transitioning to a pass state in the FSM in response to evaluation of at least one state of the FSM evaluating to true; and transitioning to a fail state in the FSM in response to evaluation of at least one state of the FSM evaluating to false.

8. The method of claim 7, further comprising:

compiling the series of events in the statement in the circuit design into the FSM, wherein the compiling includes specifying in the FSM the pass state connected to a first set of one or more states in the FSM and the fail state connected to a second set of one or more other states of the FSM different from the first set.

9. The method of claim 1, wherein evaluation of the fork state and evaluation of the join state are initiated without waiting for an edge of the simulation clock signal, and the method further comprising:

starting a first thread at a first edge of the simulation clock signal for evaluation of the states of the FSM and starting a second thread at a second edge of the clock signal for evaluation of the states of the FSM;

merging the first thread and the second thread into a single thread in response to the second thread transitioning to a state in the FSM while the first thread is waiting at the state.

10. The method of claim 1, wherein, evaluation of the fork state and evaluation of the join state are initiated without waiting for an edge of the simulation clock signal, and the statement specifies a first sub-sequence followed by a second sub-sequence, the FSM includes first states corresponding to the first sub-sequence and second states corresponding to the second sub-sequence, the first states include a first start state and a first final state, the second states include a second start state and a second final state, the first final state is connected to the second start state, and the first start state, second start state, and second final state are transient states, and the method further comprising:

evaluating the first start state without waiting for an edge of the simulation clock signal;

evaluating, in response to transitioning to the second start state, the second start state without waiting for an edge of the simulation clock signal; and evaluating, in response to transitioning to the second final state, the second final state without waiting for an edge of the simulation clock signal.

11. The method of claim 1, further comprising:

starting a first thread at a first edge of the simulation clock signal for evaluation of the states of the FSM and starting a second thread at a second edge of the clock signal for evaluation of the states of the FSM;

merging the first thread and the second thread into a single thread in response to the second thread transitioning to a state in the FSM while the first thread is waiting at the state;

wherein the statement specifies a first sub-sequence followed by a second sub-sequence, the FSM includes first states corresponding to the first sub-sequence and second states corresponding to the second sub-sequence, the first states include a first start state and a first final state, the second states include a second start state and a second final state, the first final state is connected to the second start state, and the first start state, second start state, and second final state are transient states;

evaluating the first start state without waiting for an edge of the simulation clock signal;

evaluating, in response to transitioning to the second start state, the second start state without waiting for an edge of the simulation clock signal; and evaluating, in response to transitioning to the second final state, the second final state without waiting for an edge of the simulation clock signal.

12. A system comprising:

one or more processors;

a memory arrangement coupled to the one or more processors, wherein the memory arrangement is configured with instructions that when executed by the one or more processors, cause the one or more processors to:
- simulate a circuit design specified in a hardware description language (HDL);
- start during simulation, a thread at an edge of a simulation clock signal for evaluation of states of a finite state machine (FSM) that represent a series of events specified in a statement in the HDL;
- transition from one state to a next state in the FSM by the thread in response to evaluation of the one state;
- fork a thread into two threads during simulation in response to encountering a fork state in the FSM, wherein the fork state represents a composite operator in the statement, and the FSM has a branch from the fork state for each operand of the composite operator;
- join the two threads into one thread in response to encountering a join state in the FSM by the two threads; and
- generate implementation data from the circuit design for making an integrated circuit (IC) based on the implementation data.

13. The system of claim 12, wherein the memory arrangement is further configured with instructions that cause the one or more processors to:
compile the series of events in the statement in the circuit design into the FSM, wherein compilation includes specifying the fork state and the join state in the FSM in response to the composite operator in the statement.

14. The system of claim 12, wherein evaluation of the fork state and evaluation of the join state are initiated without waiting for an edge of the simulation clock signal.

15. The system of claim 12, wherein the memory arrangement is further configured with instructions that cause the one or more processors to:
- start a first thread at a first edge of the clock signal for evaluation of the states of the FSM and start a second thread at a second edge of the simulation clock signal for evaluation of the states of the FSM; and
- merge the first thread and the second thread into a single thread in response to the second thread transitioning to a state in the FSM while the first thread is waiting at the state.

16. The system of claim 12, wherein the statement specifies a first sub-sequence followed by a second sub-sequence, the FSM includes first states corresponding to the first sub-sequence and second states corresponding to the second sub-sequence, the first states include a first start state and a first final state, the second states include a second start state and a second final state, the first final state is connected to the second start state, and the first start state, second start state, and second final state are transient states, the memory arrangement further configured with instructions that cause the one or more processors to:
- evaluate the first start state without waiting for an edge of the simulation clock signal;
- evaluate, in response to transitioning to the second start state, the second start state without waiting for an edge of the simulation clock signal; and
- evaluate, in response to transitioning to the second final state, the second final state without waiting for an edge of the simulation clock signal.

17. The system of claim 16, wherein the memory arrangement is further configured with instructions that cause the one or more processors to:
compile the series of events in the statement in the circuit design into the FSM, wherein compilation includes specifying in the FSM, in response to the statement including the first sub-sequence followed by the second sub-sequence, the first start state, the first final state, the second start state, the second final state, and a state transition from the first final state to the second start state.

18. The system of claim 12, wherein the memory arrangement is further configured with instructions that cause the one or more processors to:
- transition to a pass state in the FSM in response to evaluation of at least one state of the FSM evaluating to true; and
- transition to a fail state in the FSM in response to evaluation of at least one state of the FSM evaluating to false.

* * * * *